Feb. 3, 1970     R. E. CLARKE     3,492,990
COMBINATION CONTRACEPTIVE DEVICE AND INSERTER
Filed June 15, 1967     4 Sheets-Sheet 1
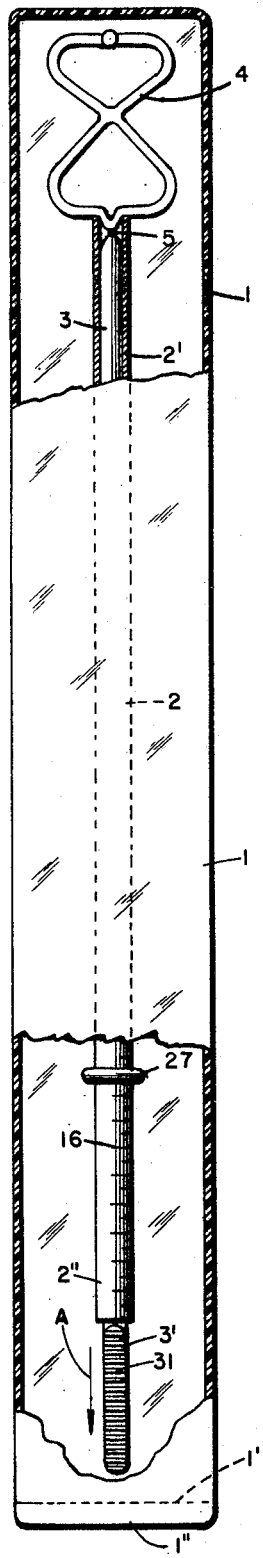
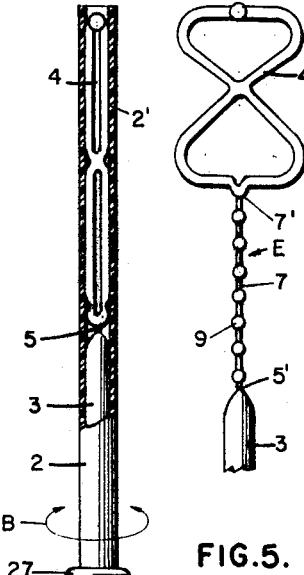
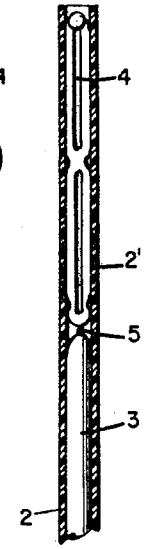
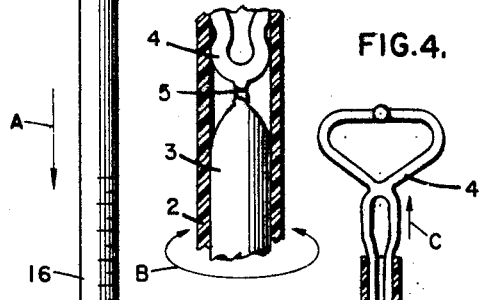
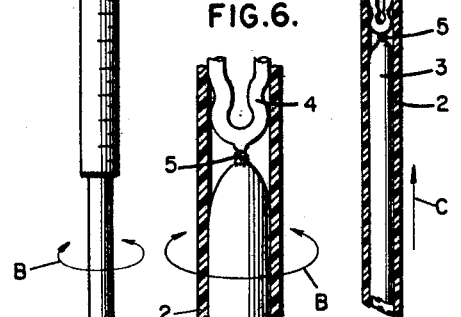
*INVENTOR*
ROBERT E. CLARKE
BY
*ATTORNEY*

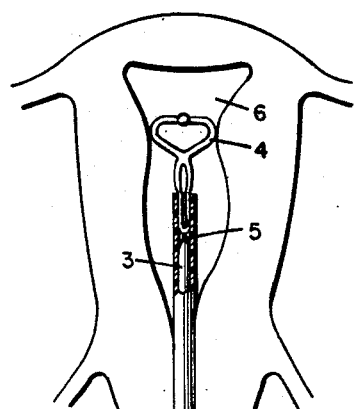
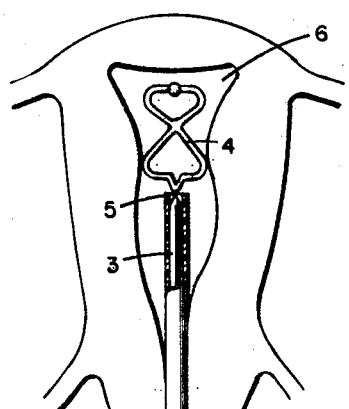
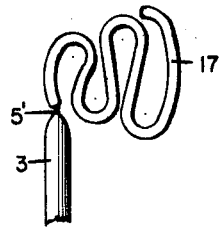
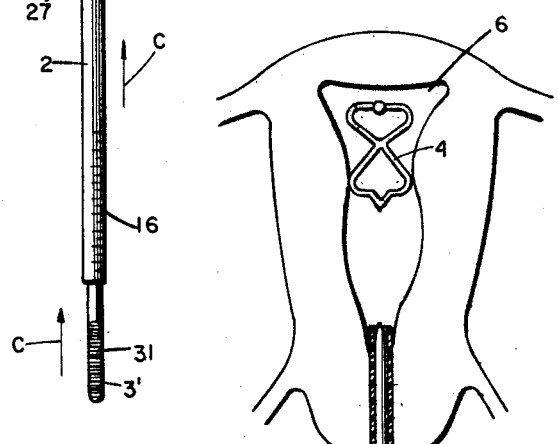
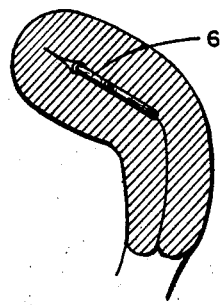
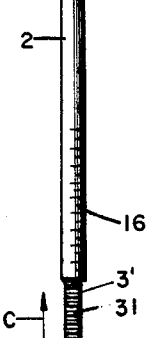

Feb. 3, 1970 R. E. CLARKE 3,492,990
COMBINATION CONTRACEPTIVE DEVICE AND INSERTER
Filed June 15, 1967 4 Sheets-Sheet 3

INVENTOR
ROBERT E. CLARKE

BY
*Jwerley Swert*
ATTORNEY

Feb. 3, 1970  R. E. CLARKE  3,492,990
COMBINATION CONTRACEPTIVE DEVICE AND INSERTER
Filed June 15, 1967  4 Sheets-Sheet 4
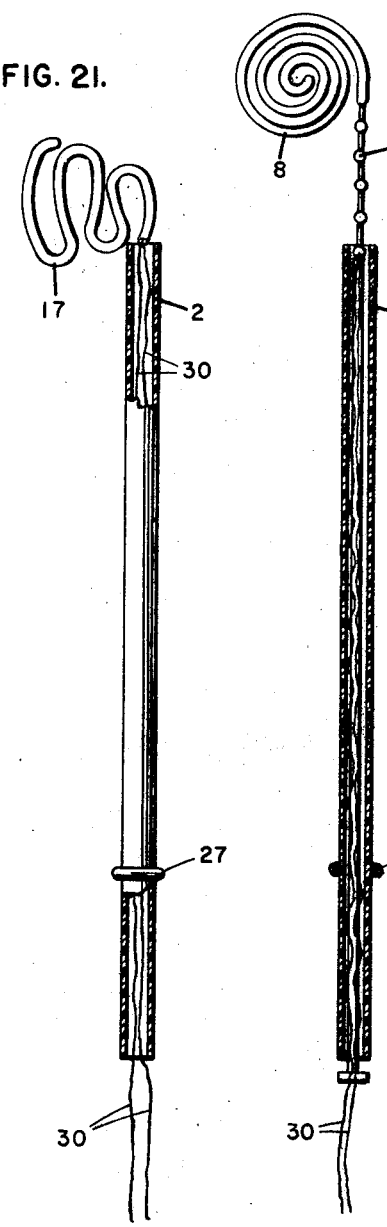
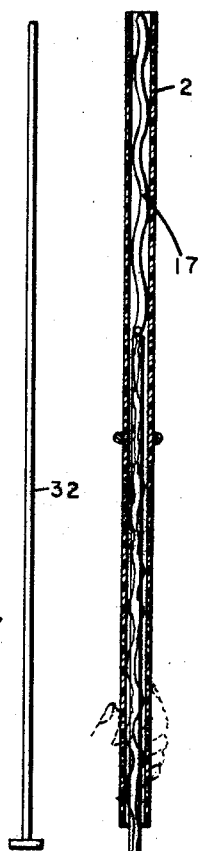
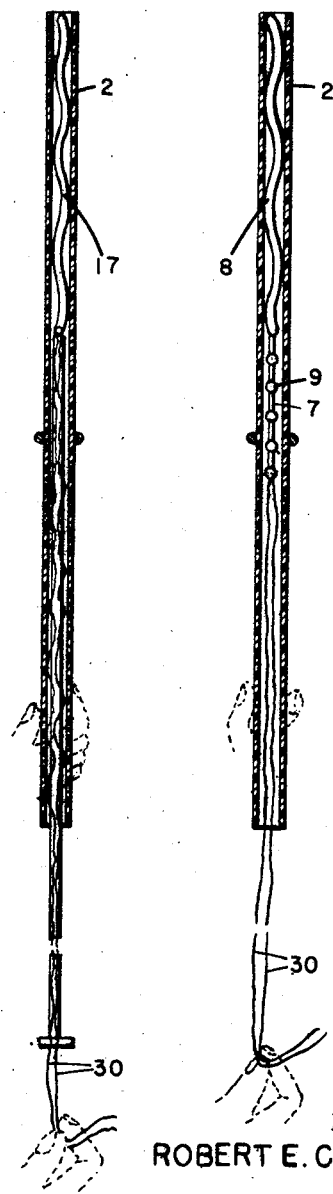
INVENTOR
ROBERT E. CLARKE
BY
ATTORNEY

United States Patent Office 3,492,990
Patented Feb. 3, 1970

3,492,990
COMBINATION CONTRACEPTIVE DEVICE AND INSERTER
Robert E. Clarke, 1410 Saratoga Drive,
Belair, Md. 21014
Filed June 15, 1967, Ser. No. 646,331
Int. Cl. A61f 5/46
U.S. Cl. 128—130                    6 Claims

ABSTRACT OF THE DISCLOSURE

The contraceptive device inserter is equipped with a plunger operatable within a tube in which the contraceptive is drawn within the tube by suitable means from a point adjacent one end of the tube and is ejectable from the tube by operating the plunger against the inner end of the contraceptive device.

---

The invention relates to a disposal intrauterine contraceptive device (IUCD) inserter, and a method of introducing the contraceptive into the female uterus.

One object of the invention is to arrange the contraceptive device and inserter within a single sealed sterilized package where it is kept until time for use.

Another object of the invention is to position the contraceptive adjacent one end of the tube having means fixedly secured thereto and adapted to extend through the tube for drawing the contraceptive into the first mentioned end of the tube.

A further object of the invention is to provide means for forcing the contraceptive out of the tube and in position within the uterus.

A still further object of the invention is to provide adjustable and selectable means for positively determining and indicating the extent the device is to be inserted in placing the contraceptive into the uterus.

A still further object of the invention is to provide a contraceptive inserter of such low cost that it may be economically discarded after a single use.

While several objects of the invention have been pointed out, other objects, uses and advantages will become more apparent as the nature of the invention is more fully disclosed as shown in the accompanying drawings and described in the following detailed description, in which FIGURE 1 is a side elevation partly in section of the contraceptive inserter device with attached contraceptive, including package 1, which is also shown partly in section and partly in elevation, carrying the device in a pre-sterilized condition;

FIGURE 2 is a side elevation partly in section and partly in elevation of a contraceptive device and the inserter therefor after the contraceptive device is drawn into an inserter tube;

FIGURE 3 is a fragmentary sectional view of the contraceptive device retaining tube and the contraceptive device after it has been drawn into the tube by the inserter plunger;

FIGURE 4 is a view similar to that shown in FIGURE 3 showing the contraceptive being partly ejected from the tube;

FIGURE 5 is an enlarged detail view of the connection between the contraceptive device and the inserter plunger;

FIGURE 6 is an enlarged detail view of the connection between the contraceptive device and its inserter plunger after it has been broken;

FIGURE 7 is a detail view in elevation of a chain or bead-like extension for purposes of determining manually or visually if the contraceptive is still in position in the uterine cavity with a break-off point adjacent the end of the inserter plunger;

FIGURE 8 is a view of the contraceptive device being inserted within the uterus;

FIGURE 9 is a view of the contraceptive device fully inserted within a uterus;

FIGURE 10 is a view of the inserter device being withdrawn after the contraceptive device has been inserted within the uterus;

FIGURE 11 is a schematic side elevational view of a contraceptive device positioned within the uterus;

FIGURE 12 is a side elevation of a looped form of contraceptive device known as a "Lippes Loop";

FIGURE 13 is a view in elevation of a coiled form of contraceptive device known as the "Marguiles Spiral" or "Gynecoil" illustrated with a chain or bead-type extension connector thereto;

FIGURE 21 is a view partly in elevation and partly in section of a contraceptive device and an inserter showing a thread, suture or cord secured to the contraceptive device for moving the same into the inserting tube;

FIGURE 22 is a view similar to FIGURE 21 showing the contraceptive drawn into the tube prior to insertion into the uterus;

FIGURES 23 and 24 illustrate the manner in which the thread or suture is attached to the contraceptive when the contraceptive is provided with a chain or bead-like extension;

FIGURE 25 shows a form of plunger used with the type of device shown in FIGURES 21 to 24.

Like character references are used throughout the following specifications and the accompanying drawings to designate corresponding parts.

Figure 16:
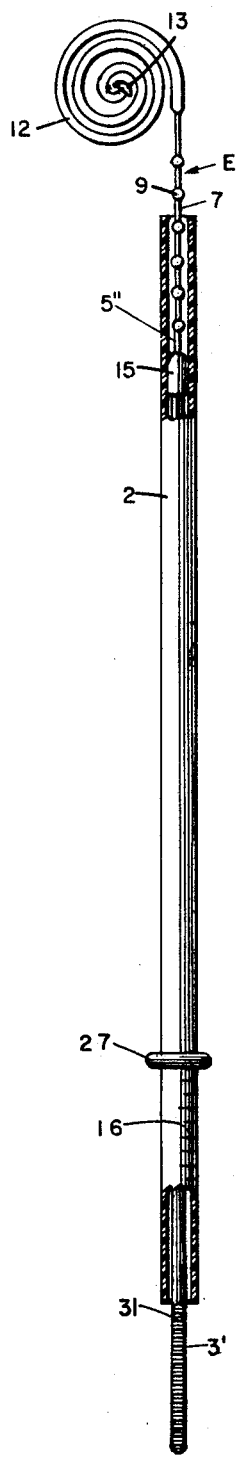
FIGURE 16 is a side elevational view of a "Margulies Spiral" type contraceptive device and inserter device wherein the contraceptive device is provided with a chain or bead-type extension and a coupler connecting the end of the extension to the plunger.

In carrying out my invention, I provide an improved contraceptive inserter device which may be placed in a package 1, preferably of transparent material, and comprising an inserter tube 2 into which the contraceptive device may be confined during the time it is being inserted into the uterus, and a plunger 3 slidable within the tube and of somewhat greater length than the tube.

In FIGURES 1 to 10 there is shown one form of the contraceptive device and the method of inserting the device into the uterus. This form of contraceptive device is well known in the art as "The Birnberg Bow" and follows the general configuration of an hourglass and is designated by the numeral 4 throughout the several views.

In FIGURES 1 to 6 inclusive, the contraceptive device 4 is shown formed integral with the plunger 3, as shown at 5, which is of substantially less cross-sectional area than either the contraceptive device or the plunger 3. This reduced area is vulnerable to breaking by rotating the plunger 3 relative to the contraceptive device.

The contraceptive device 4, as shown in FIGURE 1, remains outside the tube in the sterilized and sealed package 1 until ready for use.

When ready for use the end 1″ of the package is removed along the line 1′ where the end 2″ of the tube may be grasped with one hand and the end 3′ of the plunger may be grasped with the other hand. At this point the plunger is drawn outwardly of the tube 2 drawing the contraceptive device into the opposite end of the tube as shown in FIGURE 2. After the contraceptive device is completely within the tube, the plunger is then separated from the contraceptive device by rotating the same. The point of separation between the contraceptive device 4 and the plunger 3 is calculated to be between the inner end of the plunger and the contraceptive device as indicated by the numeral 5. This detail construction of the contraceptive device and the operation of separating the contraceptive device from the plunger is illustrated best in FIGURES 2 to 6.

In FIGURE 5 the plunger 3 is shown at the beginning of its rotation which is done manually by rotating the plunger from its outer end 3′ extending beyond the end of the tube 2 in the direction of the arrow B (see FIGURES 4, 5, and 6) while restraining the rotation of the tube. The contraceptive device will be held tightly within the end 2′ of the tube by friction. As the plunger 3 is rotated, the area 5 will break down and will completely separate the plunger from the contraceptive device as shown in FIGURE 6.

After the contraceptive device has been separated from the plunger, the inserter is ready to be inserted into the uterus and may be forced from the tube as illustrated in FIGURES 4 and 8 by moving the plunger in the direction of the arrow C.

The contraceptive device such as shown in FIGURES 7, 13, 16, 17, 19 and 20 is provided with an extension E formed of chain or bead-like elements 8 and 9. Where the extension E is made an integral part of the plunger the break-off point is between the outer end of the extension E and the inner end of the plunger, as shown at 5′ in FIGURES 7 and 13, that is, when the plunger is rotated it will be detached from the outer end of the member E.

In FIGURES 12 and 21 there is illustrated a "Lippes Loop" 17 which is adapted to be drawn into the tube 2 and expelled as previously described for the "Birnberg Bow." FIGURES 13, 16, 18 and 23 shows the "Margulies Spiral" which is also adaptable for use with the tube 2 and plunger 3.

In FIGURE 10 there is illustrated the "Birnberg Bow" after it has been separated from the plunger 3 and is in place in the uterus and the tube and plunger have been partly withdrawn. FIGURE 11 shows diagrammatically the contraceptive device in place in the uterus 6 with the tube and plunger fully withdrawn.

Figure 18:
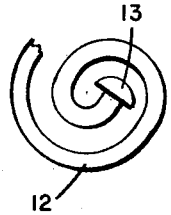
FIGURE 18 is an enlarged fragmentary view of the "Margulies Spiral" having means on its outer end to limit its movement into the tube.
Figure 17:
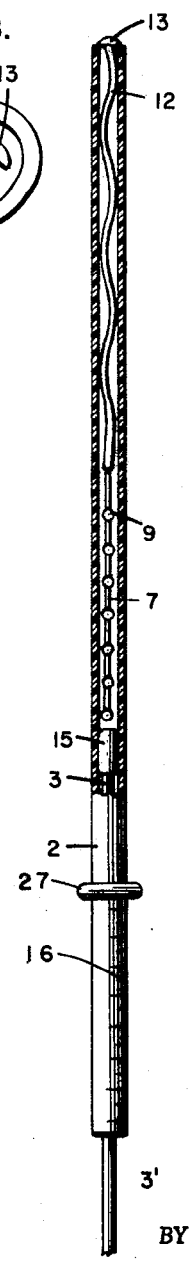
FIGURE 17 is a view similar to FIGURE 16 showing the spiral type contraceptive device drawn into the tube ready for insertion into the uterus.
Figure 15:
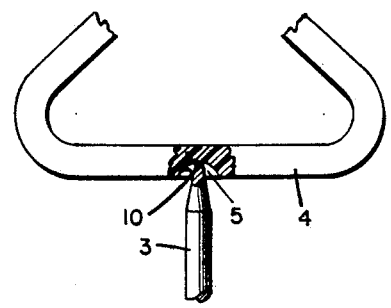
FIGURE 15 is a fragmentary detail side view partly in section similar to FIGURE 14.
Figure 14:
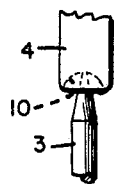
FIGURE 14 is an enlarged fragmentary edge view of the extension positioned between the contraceptive device and the plunger showing a recess in which the plunger is connected to the contraceptive device to prevent ragged or sharp edges from extending beyond the surface of the contraceptive device after separation.
Figure 19:
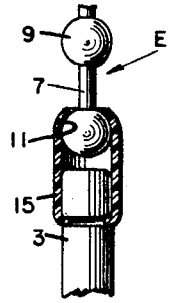
FIGURE 19 is a sectional view showing a form of coupling for connecting the end of the plunger to the end of the chain or bead-like extension carried by the contraceptive device.
Figure 20:
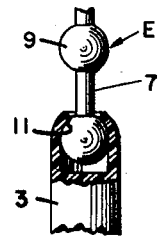
FIGURE 20 is a side elevational view partly in section, similar to FIGURE 19, showing the end of the plunger formed into a connector for engaging the end of the chain or bead-like extension attached to the contraceptive device.

FIGURES 14 and 15 show the break-off point 5 secured into a recess 10 of the contraceptive device 4. This is to prevent any irregular edges from presenting themselves beyond the outer surface of the contraceptive device to irritate the user. FIGURES 19 and 20 show a coupling 15 to be preferably of a semi-rigid springy material for use preferably with the chain or bead-like extension E which is attached to the outer ends thereof and will be referred to more fully later. This coupling is of sufficient holding effect to draw the contraceptive into the tube 2, but with slightly greater pull will open up to disconnect the extension from the end of the plunger as shown in FIGURE 17. The "Margulies Spiral," shown in FIGURES 16, 17 and 18, is provided with an enlarged end 13 to prevent it from being drawn too far into the end of the tube. This enlarged end is particularly advantageous when using the coupling 15.

FIGURES 21 to 24 are all shown using either the "Lippes Loop" or the "Margulies Spiral," the difference in the assembly being that in this group the contraceptive is drawn into the tube by a flexible strand, suture or thread 30, and the plunger 32, shown in FIGURE 25, is not connected with the contraceptive device in any manner and is only used to force the contraceptive from the tube.

The thread 30 extends through the tube 2 and beyond the opposite end which may be engaged to pull the contraceptive into the end of the tube, as illustrated in FIGURES 22 and 24. The thread is left connected to the contraceptive as a telltale that the device is in place.

The chain or bead-like extension E, shown in FIGURES 23 and 24, has one end fixedly connected to the contraceptive device and its opposite end attached to the thread 30 which is used to draw the contraceptive device into the tube. The plunger in this case presses against the outer end of the extension E to force the contraceptive device from the tube.

The purpose of the chain or bead-like extension E, which is very flexible, after it leaves the tube or the thread 30, is to act as a telltale, that is, the outer ends are snipped off close to the outer opening of the vagina or uterine chamber but of such length as to feel or see. Therefore, the presence of either of these telltales, as the case may be, will assure the user or physician that the contraceptive is still in place. Without these telltales the user must be X-rayed to disclose its presence. The plunger may have calibration 31 along the outer end portion for gauging the distance the plunger is extended into the tube which in turn will tell when the particular contraceptive device has been forced from the tube. Also, the tube may be provided with markings 16 and a frictional slidable ring 27 which may be adjusted along the tube after the examination to indicate the distance the tube is to be inserted into the vagina before ejecting the contraceptive device.

The contraceptive device and the inserted assembly being in a sterilized container makes it ready for immediate use.

In operation, first, the using party should be X-rayed to determine what position and location the contraceptive device is to be placed and the size of the contraceptive device to be used. The assembly in FIGURES 1 to 10 is illustrative of its use. The assembly is removed from the sterilized package 1 by tearing off the end 1″ of the package. The contraceptive device is drawn into the tube 2 by withdrawing the plunger 3 as shown in FIGURES 2 and 3. The plunger is then rotated to separate the plunger from the contraceptive device, or pulled if a coupling, such as that shown in FIGURES 16, 17, 19, 20, is used. The tube 2 and plunger 3 being quite flexible are then inserted through the vagina into the uterus where the contraceptive device is forced out of the tube 2 by the plunger 3 as shown and described. If the telltale extension E, or thread 30, is used with the contraceptive device, the physician may cut off any excess portion of the thread so that it will not protrude or be disturbing to the user leaving only enough to feel or see to determine if the contraceptive device is in position. It must be born in mind that when the contraceptive is ready for insertion into the uterus regardless of the form used the plunger must be separated from the contraceptive device if attached.

From the foregoing it will be apparent that the combination contraceptive device and inserter disclosed herein is a practical, highly efficient, cheap and sanitary unit in which the tube and plunger are disposable after the contraceptive device has been inserted into the uterus.

I claim:
1. A combination contraceptive device and inserter assembly comprising an elongated tube, a normally extended contraceptive device adapted to be collapsed into one end of the tube, a semi-flexible stem having one end of reduced cross section and integrally connected at a point on said contraceptive device, said stem being slidable within said tube and extending beyond the opposite end thereof for moving the contraceptive device in and out of the said tube.

2. A combination contraceptive device and inserter assembly as claimed in claim 1 wherein the connection between the contraceptive device and the stem is provided with a weakened area adjacent the contraceptive device designating the breakoff point between the contraceptive device and the stem.

3. A combination contraceptive device and inserter assembly as claimed in claim 2 wherein the contraceptive device is provided with a protective recess therein wherein the point of break-off between the contraceptive device and the stem is positioned within the recess.

4. A combination contraceptive device and inserter assembly as claimed in claim 1 wherein the stem is made in at least two parts, the first part having one end integrally connected to the contraceptive device and extending part way into one end of the tube, and the second part having one end attached to the opposite end of the first part and its opposite end extending beyond the opposite end of the tube.

5. A combination contraceptive device and inserter assembly as claimed in claim 2 wherein the first part of the stem is formed of a semi-flexible head-like member having one end integrally connected to the contraceptive device and its opposite end integrally connected to one end of the second portion of the stem.

6. A method of placing a collapsible contraceptive device into a tube and ejecting the same into the uterus comprising the steps:
   (1) integrally connecting one end of a semi-flexible stem of a length longer than the tube to a point on the contraceptive device;
   (2) extending the stem through the tube and manually drawing the contraceptive device into one end of the tube;
   (3) disconnecting at least the portion of the stem extending beyond the end of the tube;
   (4) inserting the end of the tube containing the contraceptive device into the uterus, expelling the said device into the uterus from the tube by applying an opposite force to the stem and thereafter removing the tube and the detached portion of the stem from the uterus.

References Cited
UNITED STATES PATENTS 3,253,590  5/1966  Birnberg et al. _____ 128—130
3,372,695  3/1968  Beliveau et al. _____ 128—130
3,382,869  5/1968  Rigney et al. _____ 128—130

ADELE M. EAGER, Primary Examiner

U.S. Cl. X.R.
206—63.2